US012354278B2

(12) United States Patent
Vestad et al.

(10) Patent No.: US 12,354,278 B2
(45) Date of Patent: Jul. 8, 2025

(54) METHOD FOR EXTRACTING OBSTRUCTING OBJECTS FROM AN IMAGE CAPTURED IN A MULTIPLE CAMERA SYSTEM

(71) Applicant: Muybridge AS, Oslo (NO)

(72) Inventors: Vegard Nitter Vestad, Oslo (NO); Espen Christensen, Oslo (NO)

(73) Assignee: Muybridge AS, Stord (NO)

( * ) Notice: Subject to any disclaimer, the term of this patent is extended or adjusted under 35 U.S.C. 154(b) by 0 days.

(21) Appl. No.: 18/652,949

(22) Filed: May 2, 2024

(65) Prior Publication Data
US 2024/0371006 A1 Nov. 7, 2024

(30) Foreign Application Priority Data

May 4, 2023 (NO) .................................. 20230520

(51) Int. Cl.
*G06T 7/194* (2017.01)
*G06T 5/77* (2024.01)
*G06T 7/254* (2017.01)

(52) U.S. Cl.
CPC ............... *G06T 7/194* (2017.01); *G06T 5/77* (2024.01); *G06T 7/254* (2017.01); *G06T 2207/10016* (2013.01); *G06T 2207/30196* (2013.01)

(58) Field of Classification Search
CPC .. G06T 5/50; G06T 5/77; G06T 7/194; G06T 7/254; G06T 7/596; G06T 7/70;
(Continued)

(56) References Cited

U.S. PATENT DOCUMENTS 9,390,328 B2 * 7/2016 Shreve ..................... G06T 7/20
2012/0147205 A1 * 6/2012 Lelescu .................. H04N 23/62
348/E5.024
(Continued)

FOREIGN PATENT DOCUMENTS

EP        3866104 A1 *  8/2021
WO  WO-2021160476 A1 *  8/2021

OTHER PUBLICATIONS

Ceulemans et al. "Robust multiview synthesis for wide-baseline camera arrays." IEEE Transactions on Multimedia 20.9 (2018): 2235-2248. (Year: 2018).*
(Continued)

*Primary Examiner* — Katrina R Fujita
(74) *Attorney, Agent, or Firm* — Leech Tishman Fuscaldo & Lampl, LLC

(57) ABSTRACT

The present invention provides a system and method for utilizing multiple camera systems for extracting obstructing objects or foreground close to primary camera(s) and filling in the unknown area using pixel information obtained from multiple cameras, i.e. synthesized images where foreground obstructions are removed is provided. This is done by using a primary camera capturing a target scene in the background, obstructed by foreground, and secondary cameras with viewpoints different from the primary camera provide coverage of the scene behind the foreground obstructions. A processing unit will synthesize the image from the primary camera by replacing foreground obstructions with pixels from secondary cameras, or a combination of both to obtain a transparent obstructing object with the background visible through the object. The area to be replaced is identified by calculating depths in the captured area of the primary camera, estimated by comparing images from multiple cameras.

8 Claims, 4 Drawing Sheets

(58) Field of Classification Search
CPC . G06T 2207/10016; G06T 2207/20221; G06T 2207/30196
See application file for complete search history.

(56) References Cited

U.S. PATENT DOCUMENTS

| | | | |
|---|---|---|---|
| 2012/0262569 | A1 | 10/2012 | Cudak et al. |
| 2016/0140700 | A1* | 5/2016 | Park ................ G06T 5/77 382/275 |
| 2024/0013351 | A1* | 1/2024 | Liu ................ H04N 23/632 |

OTHER PUBLICATIONS

Dai et al. "View synthesis with hierarchical clustering based occlusion filling." 2017 IEEE International Conference on Image Processing (ICIP). IEEE, 2017. (Year: 2017).*

Jorissen et al. "Multi-view wide baseline depth estimation robust to sparse input sampling." 2016 3DTV-Conference: The True Vision-Capture, Transmission and Display of 3D Video (3DTV-CON). IEEE, 2016. (Year: 2016).*

Yokoi et al. "Novel view synthesis for dynamic scene using moving multi-camera array." Stereoscopic Displays and Applications XXII. vol. 7863. SPIE, 2011. (Year: 2011).*

Lee et al. "Removing foreground objects by using depth information from multi-view images." Applications of Digital Image Processing XXX. vol. 6696. SPIE, 2007. (Year: 2007).*

Norwegian Search Report and Office Action for corresponding Patent Application No. 20230520, dated Mar. 31, 2024, 8 pages.

Garg, Apar., Stereo Vision: Depth Estimation Between Object and Camera, Published in Analytics Vidhya, Nov. 17, 2021, 20 pages.

Apar Garg, "Stereo Vision: Depth Estimation between object and camera", (2021), [Retrieved Mar. 21, 2024 from the internet] 20 pages.

Patentstyret, Norwegian Search report for corresponding application No. NO 20230520, dated Mar. 21, 2024, 2 pages.

* cited by examiner

METHOD FOR EXTRACTING OBSTRUCTING OBJECTS FROM AN IMAGE CAPTURED IN A MULTIPLE CAMERA SYSTEM

CROSS-REFERENCE TO RELATED APPLICATION

This application is related to and claims priority to Norwegian patent application No. 20230520, filed May 23, 2023, the entirety of which is incorporated herein by reference.

FIELD

The present invention relates to a system and method for extracting foreground obstacles in a video image captured by multiple camera sensors. The system includes a set of camera sensors configured to capture video images from different viewpoints. The invention can be used in areas as industry and production support, medical appliances, AV production, Video Conferencing, Broadcast, Surveillance and Security and automotive among others.

BACKGROUND

There are several challenges related to existing camera technology, each in the respective field of which the camera technology is utilized.

The use of video conferencing, television production, and use of video in surveillance and automotive among others, has become a staple in modern communication and entertainment. In such applications, the ability to extract foreground obstacles from a video image captured by multiple camera sensors has become increasingly important. The presence of foreground obstacles such as objects, people or backgrounds can degrade the video quality and disrupt the viewer experience.

An unwanted person or object may obstruct the view of a single camera. In certain situations it may be advantageous to hide the obstruction to capture what is behind. An example is the back of the head of a person blocking a conversation which the camera wants to capture.

Existing solutions for extracting foreground obstacles in video images typically rely on background subtraction or segmentation techniques. These techniques identify pixels that differ significantly from the background and label them as foreground. However, these methods often result in inaccuracies due to issues such as changes in lighting, camera motion, and occlusions. In addition, these techniques require a significant amount of computational resources, making them impractical for real-time applications. In many cases, existing technologies are based on one or few cameras, leading to missing pixels or missing coverage. Replacement pixels are therefore based on approximation, which could lead to disturbing artifacts.

There have been some recent advances in the field of deep learning for foreground extraction, which have shown promise in improving the accuracy of foreground detection. However, these techniques still require large amounts of training data and can suffer from overfitting, leading to poor generalization to new data.

Furthermore, existing solutions for foreground extraction in video images often require a single camera view or a limited number of cameras, which can result in incomplete or inaccurate foreground extraction. There is a need for a solution that can effectively extract foreground obstacles from a video image captured by multiple camera sensors in real-time, without significant computational resources and with high accuracy.

The proposed invention is a new solution for extracting foreground obstacles in a video image captured by multiple camera sensors. The invention utilizes a combination of deep learning techniques and image processing algorithms to accurately identify and extract foreground obstacles in real-time, even in complex environments with challenging lighting conditions and occlusions. The invention can be applied to various applications, including video conferencing, television production, automotive, surveillance and industrial applications to improve the viewer experience and video quality.

Therefore, there is a need for a system solving the camera related problems discussed above in various fields and applications.

SUMMARY

In view of the above, an object of the present disclosure is to overcome or at least mitigate at least some of the drawbacks related to cameras. In particular, the present application discloses a computer implemented method for utilizing a multiple camera system to capture a target view from a defined viewpoint, including at least three cameras, each of the at least three cameras and the defined viewpoint having at least partly overlapping fields of view, within which the target view and one or more obstruction objects are located, and where the target view is at least partly covered by the one or more obstructing objects or foreground in a first view of the one or more of the at least three cameras of the multiple camera system, estimating respective relative spatial depths from the at least three camera to corresponding pixel positions of the at least partly overlapping fields of view, defining a pixel as a part of a pixel area of the obstructing object or the foreground if the respective spatial depth of the pixel is below a predefined threshold, defining a camera having a field of view including pixels of a pixel area of the obstructing object or the foreground as a primary camera, selecting at least two cameras of the at least three cameras of the multiple camera system as secondary cameras having viewpoints different from the primary camera and not covering the pixel area of the obstructing object or the foreground, capturing the target view by the secondary cameras, and rendering the pixels of the target view in the pixel positions of the pixel area of the obstructing object or the foreground seen from the defined viewpoint by means of the estimated spatial depths of corresponding pixel positions relative to the secondary cameras and the defined viewpoint, respectively.

The present application also discloses a corresponding multicamera system.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
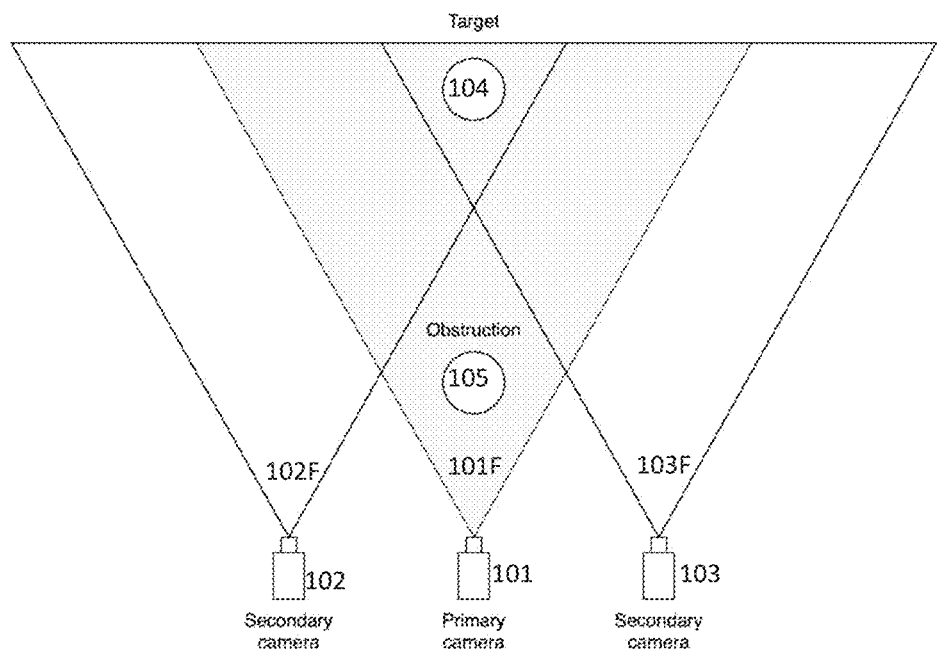
FIG. 1 illustrates an example embodiment of the present invention with the different elements included seen from above.

The different aspects of the present invention are solving certain problems related to existing camera technology.

The present invention provides a system and method for utilizing multiple camera systems for extracting obstructing objects 105 or foreground close to primary camera(s) 101 and filling in the unknown area using pixel information obtained from multiple cameras.

According to the present invention, in a multi camera sensor system, synthesized images where foreground obstructions are removed is provided.

This is done by using a primary camera 101 capturing a target view 104 from a defined view from a defined viewpoint, at least partially obstructed by one or more obstructing objects 105 or foreground, and secondary cameras 102, 103, with viewpoints 102F, 103F different from the primary camera 101, each secondary camera viewpoint 102F, 103F provides a different coverage of the scene behind the one or more obstruction objects 105.

A processing unit synthesize the image from the primary camera 101 by rendering the pixels of the target view in the pixel positions of the obstructing object 105 or foreground obstructions 105 with pixels from the secondary cameras 102, 103, or a combination of both to obtain a transparent obstructing object 400 with the background visible through the object 400.

Depths in the captured area of the primary camera 101 may be estimated by comparing images from at least three cameras 101, 102, 103.

An example of this is as follows:

$$rsd_x = \frac{|poscam_k - poscam_l| * f}{|pospix_{xk} - pospix_{xl}|}$$

Where: $poscam_k$ is the physical position of a camera k
$poscam_l$ is the physical position of a camera l
$pospix_{xk}$ is the pixel position of x captured by camera k
$pospi_{xl}$ is the pixel position of x captured by camera l
f is the focal length of camera k and l The foreground is then separated from background by using a depth threshold.

Secondary cameras 102, 103 of the multi camera sensor system that provide coverage of the scene behind the foreground obstructions 105 are selected, and unknown background where foreground is extracted is replaced with transformed and warped image pixels captured by the secondary cameras 102, 103 or with a transparent view.

More specifically, according to several embodiments of the present invention, the system, as already indicated, comprises a multicamera system with at least three cameras 101, 102, 103 with at least partly overlapping fields of view and a processing unit. Further, one or more of the cameras 101, 102, 103 are dynamically defined as primary cameras 101, at least two of the cameras 101, 102, 103 are dynamically defined as secondary cameras 102, 103.

Selecting the at least two secondary cameras 102, 103 may comprise weighting and evaluating the most optimal camera or group of cameras to reconstruct the pixel area of the obstructing object 105 or foreground as the at least two secondary cameras 102, 103. Alternatively, selecting the at least two secondary cameras 102, 103 may comprise evaluating accuracy of pixels having corresponding spatial positions in the second view by adding data from several cameras, and selecting cameras with optimal accuracy as the at least two secondary cameras 102, 103.

The primary cameras 101 have a primary field of view 101F, and the selected secondary cameras 102, 103 are positioned such that their field of view 102F, 103F overlaps with the primary cameras 101. The primary cameras 101 and secondary cameras 102, 103 may be any type of camera, including but not limited to, RGB cameras, infrared cameras, and depth cameras. An example of this is illustrated in FIG. 1, where there for simplicity and illustration purposes is one primary camera 101 and two secondary cameras 102, 103. One obstruction 105 is in the field of view 101F of the primary camera 101, and the fields of views 102F, 103F of the two secondary cameras 102, 103, together cover the background with a target 104 with is obstructed by the obstruction in the field of view 101F of the primary camera 101.

The processing unit receives input from the primary cameras 101 and secondary cameras 102, 103 and uses the depth information obtained from the multiple cameras 101, 102, 103 to identify obstructing objects 105 or foreground close to the primary cameras 101. The depth information can be obtained using any suitable method, including but not limited to, that the obstructing objects may be recognized from user input selecting the obstructing object, recognition of pre-defined shapes, patterns, objects and pixel segments, defined through depth information, or from 3D re-constructed representation of the given scene. Whenever depth information is required, algorithms and techniques for depth estimation can be applied and may vary from stereoscopic imaging, disparity maps, triangulation and/or other relational trigonometry mapping up pixels and epipolar lines between multiple cameras in a calibrated multi-camera system. A camera having a field of view including pixels of a pixel area of the obstructing object 105 or the foreground from the first view 101F may be defined as the primary camera 101.

Obstructing objects 105 in a selected primary camera 101 will be defined by a pixel area and depth information for which depth to start extraction and for which depth to stop extraction. This approach defines a volume spanned by the pixel area and depth. The volume may be defined by straight lines, i.e. rectangular pixel arrays and corresponding cubic volumes, or silhouette shaped pixel arrays with a corresponding extruded silhouette shaped volume. Given a calibrated and adjusted multi-camera system, volumetric blocks will be derived as portions of a given volume, with a configured resolution (i.e. relative or absolute size of the volumetric blocks), and missing pixels will then be generated based on projective transformation of the corresponding pixels in secondary cameras mapping up to the corresponding volumetric block. The relationship between pixel and volume block correspondence between cameras rely on depth information.

After having identified the pixels defined as constituting the obstacle 105 or foreground, the processing unit then removes these obstructing objects 105 or foreground from the primary image, leaving behind an unknown area defined by pixels in the two-dimensional plane, and as volumetric blocks in the three-dimensional space.

The secondary cameras 102, 103 are then used to capture images of the unknown area. The processing unit then uses these images to assist the primary cameras 101 in filling in the unknown area. This can be done in several ways, but in one embodiment, a new pixel replacing the extracted pixel from an obstructing object will be calculated on the corresponding transformed pixel of one or several secondary cameras 102, 103, including any necessary depth information to perform a true pixel transformation. I.e. 3D reconstruction can be used to reconstruct and approximate the whole scene, whereas a missing pixel can be rendered from the 3D scene.

Pixels might be required from several secondary cameras 102, 103. There might not be a single secondary camera 102, 103 that has all the missing pixels, and thus the pixels might have to be constructed from multiple secondary cameras 102, 103, each with partial coverage 102F, 103F of the manipulated area, but with complete coverage together.

Given an arbitrary pixel to be extracted and replaced, algorithms for seeking data to construct the replacement pixel may be based on (i) creating a subset of secondary cameras 102, 103 covering the targeted pixel or volumetric block to be replaced; (ii) weighting and evaluating the most optimal camera or group of cameras to reconstruct the targeted pixel; or (iii) evaluating the accuracy of the reconstructed targeted pixel with the possibility of always increasing the accuracy by adding data from several cameras.

Given a calibrated multi camera system with both extrinsic and intrinsic calibration, transformation matrices form a basis for an arbitrary pixel in a first camera 101 may be mapped and translated into a line in a second camera 102, 103 covering the same scene. Depth estimation or pattern recognition will determine where along that line the corresponding pixel is located. The replacement pixel can be constructed from one secondary camera 102, 103, selected from weight-functions, or averaged and constructed by multiple secondary cameras 102, 103.

Blind spots and areas of the extracted pixels which is not covered by any camera, may have to follow approximation principals and filled according to either neighboring pixels or approximated pixels based on recognized texture of larger area, i.e. pattern recognition.

In case of a moving camera point of view, or in case of PZT, the process of extracting and filling in pixels must be in real time corresponding with the movements without disturbing image stuttering. The transformative steps and calculations for each corrected pixel, according to embodiments of the present invention, are therefore stored so that for each new frame, pixel calculations will follow the stored pre-defined calculative steps. In case the necessary secondary cameras are blocked in a future frame, the manipulated area can use old pixels from old frames instead of approximation.

The volumetric block containing the foreground is tracking movement of the desired object.

Any obstructing object 105 selected for extraction will be continuously tracked between each incoming frame, obtaining an updated position of the pixel segment if the object is moved between frames. New pixels will always follow parametrized calculative steps, whereas updated positions will correct these parametrized calculative steps as well.

Figure 2:
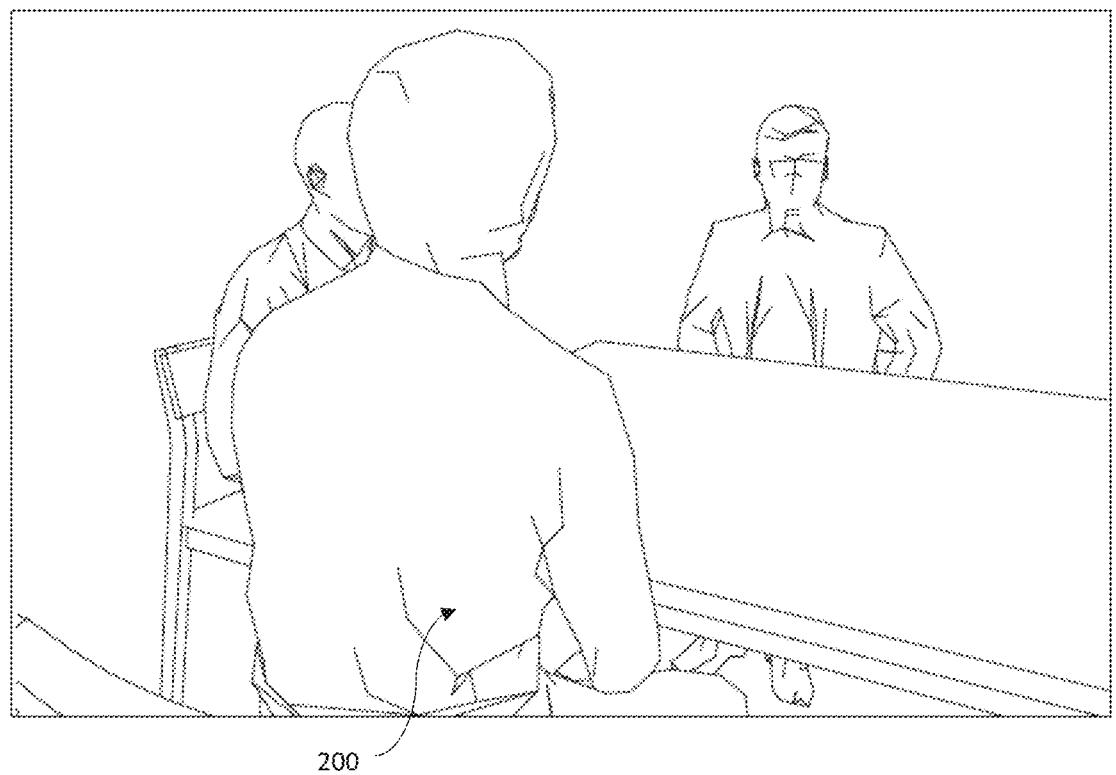
FIG. 2 illustrates an example image captured by a primary camera in a multi camera system.
Figure 3:
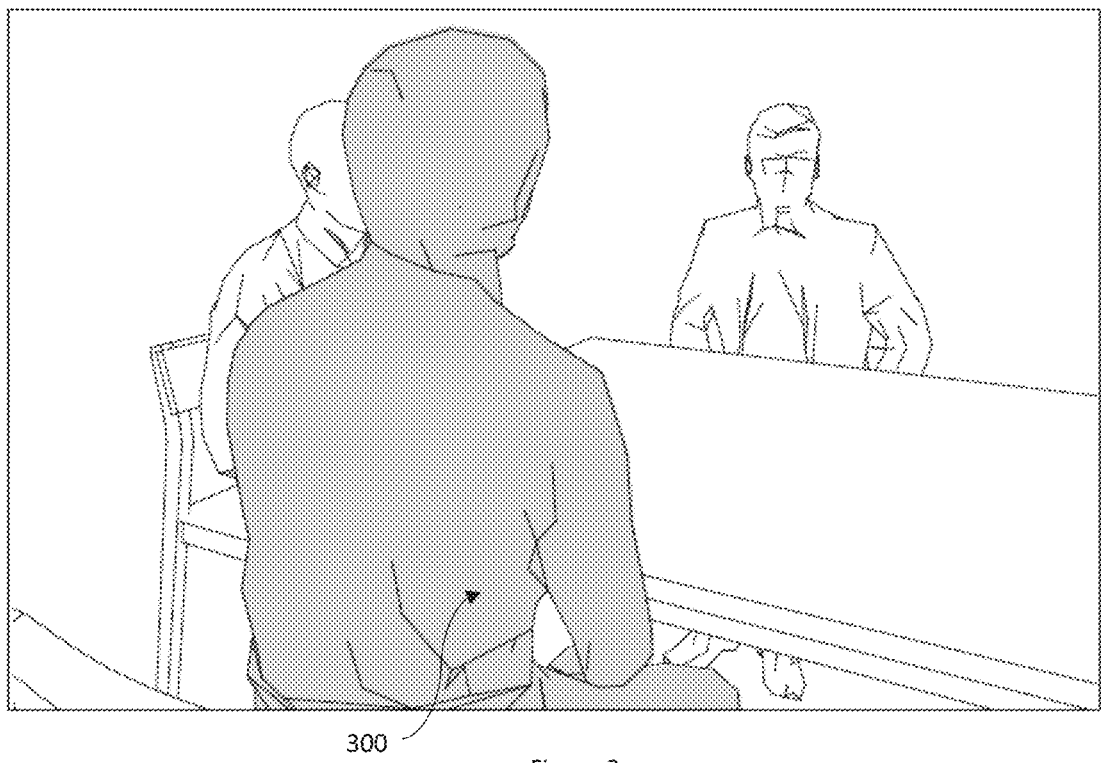
FIG. 3 illustrates the example image of FIG. 2 where an identified obstructing object is indicated by a silhouette.
Figure 4:
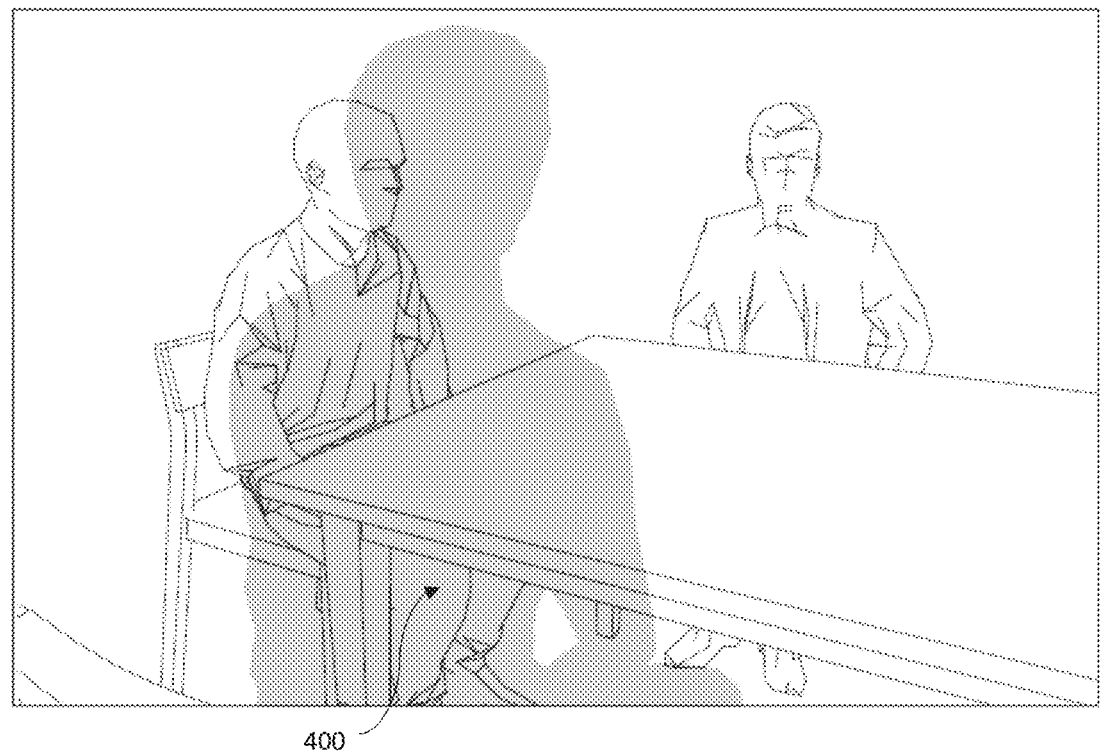
FIG. 4 illustrates the example image of FIG. 2 where an identified obstructing object is indicated by a transparent silhouette, showing the background behind the obstructing object.
Figure 5:
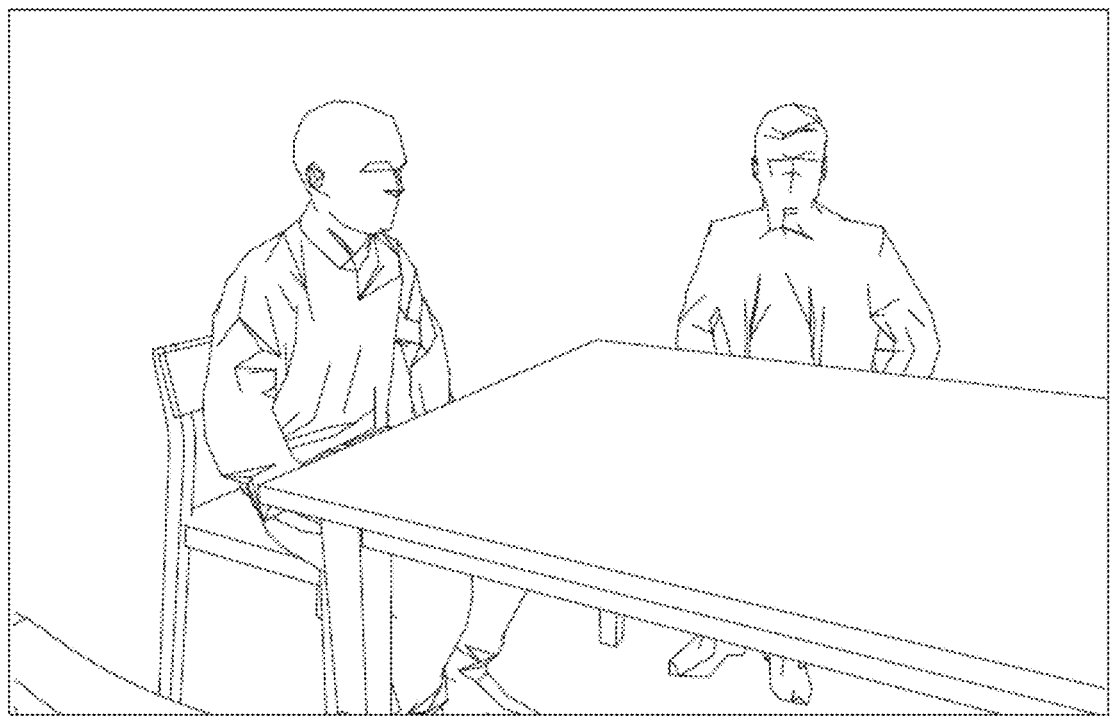
FIG. 5 illustrates the example image of FIG. 2 where the obstructing object is totally removed, and replaced by the background captured by secondary cameras in the multi-camera system.

The result is a composite image that shows what is behind the obstructing objects or foreground, either by replacing the obstructing object 105 with a transparent object with the background shining through or replacing the obstructing object completely with the background. This is illustrated in FIGS. 2-5, where FIG. 2 shows the original image captured by one or more primary cameras, FIG. 3 indicates the identified obstacle 200 as a silhouette 300, FIG. 4 shows the result after having replaced the obstacle 200 with a corresponding transparent object 400 with the background visible through it, and FIG. 5 shows the result when the obstacle 200 is completely replaced by the background.

Figure 6:
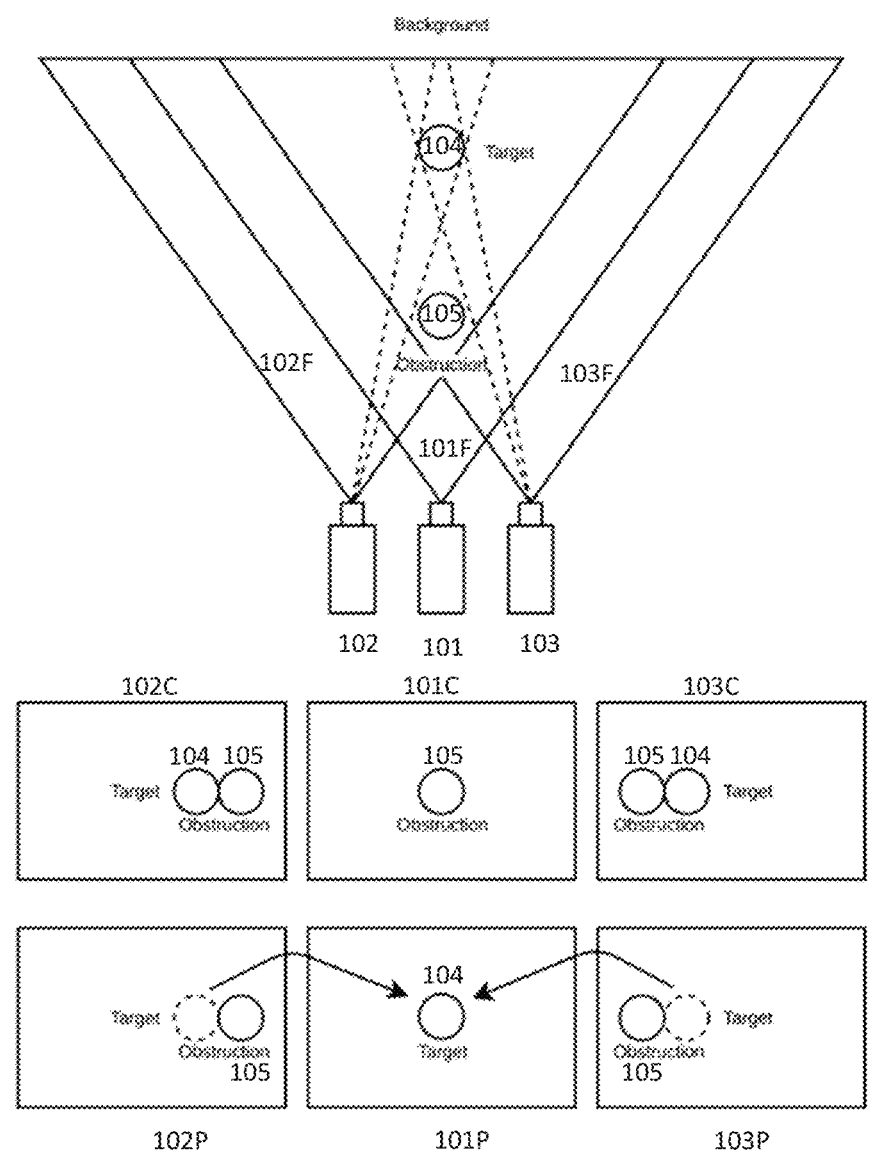
FIG. 6 illustrates an example embodiment of the present invention.

FIG. 6 illustrates an exemplary embodiment of the present invention where the target view 104 is covered by the obstructing object 105 in the first view 101F. The two secondary cameras 102, 103 have viewpoints 102F, 103F different from the primary camera 101 and are not covering the pixel area of the obstructing object 105 or the foreground. The secondary cameras 102, 103 are capturing different images 102C, 103C including both the target 104 and the obstruction 105, whereas the primary camera 101 is capturing images 101C including the obstruction 105. The pixels of the target view are rendered in the pixel positions of the pixel area of the obstructing object 105 or the foreground seen from the defined viewpoint by means of the estimated spatial depths of corresponding pixel positions relative to the secondary cameras and the defined viewpoint, respectively.

The overlapping views 102F, 103F of the target 104 allows for estimating the depth of the target 104, and with that warp the pixels from the secondary cameras 102, 103 to the primary camera 101 and fill in the removed foreground with the target view pixels from a defined viewpoint, which may or may not be the viewpoint of the primary camera. Furthermore this allows, as illustrated, the main camera 101 to be fully occluded, making the primary camera 101 optional, and the relative position of a defined viewpoint in between the secondary cameras would determine the target's position in the view, by means of the estimated spatial depths of corresponding pixel positions relative to the secondary cameras and the defined viewpoint, respectively. By utilizing the estimated spatial depths relative to the secondary cameras and the defined viewpoint, the whole unobstructed target can be placed in the "right" position seen from the defined viewpoint.

The present invention will provide increased camera coverage, and remove unwanted obstructions which might occur in sensible situations such as in broadcast and in video conferencing, but also in a wide range of other applications like video assistive referee (VAR) or replays in sports, with players occluding the situation to review or replay. To make objects transparent in surveillance, to peak around a corner by having the wall and corner transparent. To remove or make chassis parts transparent within automotive, autonomous driving and remotely controlled vehicles. Or to make the vehicle invisible or transparent, this is done today for both military tanks and the F-35 jet fighter.

The system and method of the present invention have several advantages over existing systems and methods. First, the use of multiple cameras allows for the extraction of obstructing objects or foreground close to the primary cameras with high accuracy. Second, the use of depth information obtained from multiple cameras allows for the extraction of obstructing objects or foreground even in low light conditions or when the objects are partially occluded. Third, the use of secondary cameras.

It must be emphasized that the terminology "comprise/comprises" as used in this specification is chosen to specify the presence of stated features, numbers, steps or components, but does not preclude the presence or addition of one or more other functions, numbers, steps, components or groups thereof. It should also be noted that the word "a" or "an" preceding an element does not exclude the presence of a plurality thereof.

What is claimed is:

1. A computer implemented method for utilizing a multiple camera system to capture a target view (104) from a defined viewpoint, including at least three cameras (101, 102, 103), each of the at least three cameras (101, 102, 103) and the defined viewpoint having at least partly overlapping fields of view (101F, 102F, 103F), within which the target view (104) and one or more obstruction objects (105) are located, and where the target view (104) is at least partly covered by the one or more obstructing objects (105) or foreground in a first view (101F) of the one or more of the at least three cameras (101, 102, 103) of the multiple camera system, characterized in
estimating respective relative spatial depths from the at least three camera(s) (101, 102, 103) to corresponding pixel positions of the at least partly overlapping fields of view (101F, 102F, 103F),
defining a pixel as a part of a pixel area of the obstructing object (105) or the foreground if the respective spatial depth of the pixel is below a predefined threshold,
defining a camera having a field of view including pixels of a pixel area of the obstructing object (105) or the foreground as a primary camera (101),
selecting at least two cameras (102, 103) of the at least three cameras (101, 102, 103) of the multiple camera system as secondary cameras (102,103) having viewpoints different from the primary camera (101) and not covering the pixel area of the obstructing object (105) or the foreground,
capturing the target view (104) by the secondary cameras (102, 103), and rendering the pixels of the target view in the pixel positions of the pixel area of the obstructing object (105) or the foreground seen from the defined viewpoint by means of the estimated spatial depths of corresponding pixel positions relative to the secondary cameras and the defined viewpoint, respectively.

2. A method according to claim 1, the step of estimating relative spatial depths comprises the step of calculating a respective relative spatial depth of pixel position x (rsdx) by the formula:

$$rsd_x = \frac{|poscam_k - poscam_l| * f}{|pospix_{xk} - pospix_{xl}|}$$

Where:
poscamk is the physical position of a camera k
poscaml is the physical position of a camera l
pospixxk is the pixel position of x captured by camera k
pospixxl is the pixel position of x captured by camera l
f is the focal length of camera k and l.

3. A method according to claim 1, the area of obstructing object (105) or foreground initially is indicated by a user input selecting the obstructing object (105) or foreground.

4. A method according to claim 1, the step of selecting the at least two cameras (102, 103) further includes the steps of:
(i) weighting and evaluating the most optimal camera or group of cameras to reconstruct the pixel area of obstructing object or foreground as the secondary cameras (102,103), or
(ii) evaluating accuracy of pixels having corresponding spatial positions in the second view by adding data from several cameras, and selecting cameras with optimal accuracy as the secondary cameras (102, 103).

5. A method according to claim 1, the step of capturing the target view (104) further includes the step of:
constructing an approximation of pixels having corresponding spatial positions in the second view (102F, 103F) based on neighboring pixels when spatial positions of the target view (104) are in a blind spot, and not covered by any of the secondary cameras (102, 103).

6. A method according to claim 1, the step of capturing the target view (104) further includes the step of:
constructing an approximation of pixels having corresponding spatial positions in the second view (102F, 103F) based on pattern recognition when spatial positions of the target view (104) are in a blind spot, and not covered by any of the secondary cameras (102, 103).

7. A method according to claim 1, wherein a viewpoint of the primary camera is the defined viewpoint.

8. A multiple camera system with a processor device and cameras adjusted to capture a target view, including at least three cameras (101, 102, 103), each of the at least three cameras (101, 102, 103) having at least partly overlapping fields of view (101F, 102F, 103F), within which a target view (104) and one or more obstruction objects (105) are located, and where the target view (104) is at least partly covered by the one or more obstructing objects (105) or foreground in a first view (101F) of the one or more of the at least three cameras (101, 102, 103) of the multiple camera system, wherein the processor device is adjusted to:
estimate respective relative spatial depths from the at least three camera(s) (101, 102, 103) to corresponding pixel positions of the at least partly overlapping fields of view (101F, 102F, 103F),
define a pixel as a part of a pixel area of the obstructing object (105) or the foreground if the respective spatial depth of the pixel is below a predefined threshold,
define a camera having a field of view including pixels of a pixel area of the obstructing object (105) or the foreground as a primary camera (101),
select at least two cameras (102, 103) of the at least three cameras (101, 102, 103) of the multiple camera system as secondary cameras (102,103) having viewpoints different from the primary camera (101) and not covering the pixel area of the obstructing object (105) or the foreground, and
capture the target view (104) by the secondary cameras (102, 103), and rendering the pixels of the target view in the pixel positions of the pixel area of the obstructing object (105) or the foreground seen from the defined viewpoint by means of the estimated spatial depths of corresponding pixel positions relative to the secondary cameras and the defined viewpoint, respectively.

* * * * *